United States Patent
Furuya

(10) Patent No.: US 7,784,484 B2
(45) Date of Patent: Aug. 31, 2010

(54) FUEL LEAKAGE PREVENTING VALVE

(75) Inventor: Masashi Furuya, Yokohama (JP)

(73) Assignees: Piolax Inc., Kanagawa (JP); Horie Kinzoku Kogyo Kabushiki Kaisha, Aichi (JP)

( * ) Notice: Subject to any disclaimer, the term of this patent is extended or adjusted under 35 U.S.C. 154(b) by 684 days.

(21) Appl. No.: 11/634,929

(22) Filed: Dec. 7, 2006

(65) Prior Publication Data
US 2007/0125428 A1    Jun. 7, 2007

(30) Foreign Application Priority Data
Dec. 7, 2005    (JP)    ............................... 2005-352899

(51) Int. Cl.
*F16K 24/04*    (2006.01)
(52) U.S. Cl. .......................................... 137/202; 137/43
(58) Field of Classification Search .................. 137/43, 137/202, 409, 429, 430, 527.4; 251/144, 251/84–86
See application file for complete search history.

(56) References Cited

U.S. PATENT DOCUMENTS

| | | | | |
|---|---|---|---|---|
| 4,915,353 A | * | 4/1990 | Danko | ........................ 251/331 |
| 5,529,086 A | * | 6/1996 | Kasugai et al. | ............... 137/202 |
| 6,123,095 A | * | 9/2000 | Kersten et al. | ............... 137/218 |
| 6,371,146 B1 | * | 4/2002 | Benjey | ........................... 137/2 |
| 6,508,263 B1 | | 1/2003 | Jahnke et al. | |

FOREIGN PATENT DOCUMENTS

JP    2003-120449    4/2003

* cited by examiner

*Primary Examiner*—John Rivell
*Assistant Examiner*—Craig Price
(74) *Attorney, Agent, or Firm*—Smith, Gambrell & Russell, LLP

(57) ABSTRACT

Disclosed is a fuel leakage preventing valve, involving no variations in valve closing characteristics, in which a vertically movable float valve is arranged in a chamber defined inside a housing and in which a valve seat of the housing communicating with an outside is opened and closed by the float valve, which has a protruding step portion formed upwardly at the center of an upper surface of the float valve, a retainer fixed to the upper surface side of the float valve, the retainer having a flange portion covering the upper surface of the float valve and a cage portion raised from the flange portion to define an accommodating space in conjunction with the protruding step portion of the float valve; and a valve body for opening and closing the valve seat of the housing is rockably accommodated in the accommodating space defined by the cage portion.

12 Claims, 12 Drawing Sheets

FUEL LEAKAGE PREVENTING VALVE

BACKGROUND OF THE INVENTION

1. Field of the Invention

The present invention relates to a fuel leakage preventing valve for preventing fuel leakage from a fuel tank at the time, for example, of cornering or rolling-over of an automobile.

2. Description of the Related Art

In a conventional fuel preventing valve, an accommodating chamber is defined inside a housing, and a float valve composed of an outer float and an inner float is arranged in the accommodating chamber so as to be vertically movable. The float valve is upwardly urged by the pressure of a spring, and a valve seat is formed on an upper partition wall side of the accommodating chamber of the housing, with the valve seat being opened and closed by a valve plate held by the float valve. As disclosed, for example, in JP 2003-120449A (corresponding to U.S. Pat. No. 6,508,263), the relationship between the outer float and the inner float of the float valve is as follows: the outer float has on its upper portion a cage portion integrally protruding therefrom, and the inner float is inserted into the outer float from below, with the valve plate being rockably retained in a space defined between the upper portion of the inner float and the cage portion.

In this fuel leakage preventing valve, constructed as described above, the float valve is normally held in the lowered state within the accommodating chamber of the housing, so the valve seat formed in the upper partition wall of the accommodating chamber is open, and fuel vapor within the fuel tank is given off, from a connection tube provided in the housing by way of a canister, to the outside. If some of the fuel in the fuel tank reaches the interior of the accommodating chamber of the housing as a result of cornering, etc. of the automobile, the float valve ascends automatically due to its buoyancy and the pressure of the spring and closes the valve seat with its valve plate, whereby it is possible to prevent fuel leakage toward the canister and further to the outside.

However, in the conventional fuel leakage preventing valve, in which the float valve is composed of the two components of the outer float and the inner float, fuel is likely to gather between the outer float and the inner float, that is, in the space where the valve plate is held. With some fuel accumulated, the float valve itself is subjected to a weight from the fuel so much that it may be impossible for the float valve to close the valve seat with its valve plate unless the liquid level is high. On the other hand, with the fuel drained to leave none or less of it, the float valve itself is subjected to a light weight from the fuel such that the float valve may ascend even if the liquid level is low, thereby closing the valve seat with its valve plate. Thus, these cause a fear of variations in valve closing characteristics.

It might be possible to provide a communication path between the outer float and the inner float in a vertical direction to discharge gathered fuel through this communication path. In this case, however, air would be allowed to flow back in bubbles from this communication path and be guided to the periphery of the valve plate to thereby fluctuate the center of buoyancy of the valve plate. This involves a fear of the sealing property becoming unstable, thus, in any case, conventional fuel leakage preventing valves have merits and demerits.

SUMMARY OF THE INVENTION

The present invention has been made with a view toward effectively solving the problems with the conventional fuel leakage preventing valves. According to a first aspect of the present invention, there is provided a fuel leakage preventing valve, in which a vertically movable float valve is arranged in a chamber defined inside a housing and in which a valve seat of the housing communicating with an outside is opened and closed by the float valve. In the fuel leakage preventing valve: a protruding step portion is formed upwardly at the center of an upper surface of the float valve; a retainer is fixed to the upper surface side of the float valve, the retainer having a flange portion covering the upper surface of the float valve and a cage portion raised from the flange portion to define an accommodating space in conjunction with the protruding step portion of the float valve; and a valve body for opening and closing the valve seat of the housing is rockably accommodated in the accommodating space defined by the cage portion, wherein the accommodating space communicates downwardly with an upper surface of the flange portion of the retainer through a communication hole.

According to a second aspect of the present invention, in the first aspect of the invention, the protruding step portion of the float valve is at least of the same height as a lower edge of the communication hole provided in the cage portion, and the lower edge of the communication hole of the cage portion is at least of the same height as the upper surface of the flange portion of the retainer.

According to a third aspect of the present invention, in the second aspect of the invention, the height of the protruding step portion of the float valve is larger than the thickness of the flange portion of the retainer.

According to a fourth aspect of the present invention, in the first aspect of the invention, a top portion of the cage portion of the retainer is relatively high in height, and an outer peripheral portion thereof is relatively low in height.

According to a fifth aspect of the present invention, in the fourth aspect of the invention, an upper partition wall of the housing is relatively high in height at around the valve seat, and a wall surface continuous therewith is relatively low in height.

According to a sixth aspect of the present invention, in the first aspect of the invention, an upper inner surface of the cage portion of the retainer is inclined to cross the envelope of the valve body from an outer side toward an inner side.

According to a seventh aspect of the present invention, in the first aspect of the invention: on an outer peripheral side surface of the float valve, there extrude a plurality of guide ribs beyond the thickness in an outer peripheral portion of the flange portion of the retainer; an annular protruding rim is formed at an outer peripheral edge of the upper surface of the float valve; and the guide ribs are connected by the protruding rim, such that the retainer can be accommodated in a recess defined between the protruding rim at the outer peripheral edge and the protruding step portion at the center.

According to an eighth aspect of the present invention, in the first aspect of the invention, a recess is formed around the protruding step portion at the center of the upper surface of the float valve, and the flange portion of the retainer is fixed in position within the recess by welding.

According to a ninth aspect of the present invention, in the first aspect of the invention, the valve body is formed as an integral unit composed of an upper layer portion formed of elastomer and a lower layer portion formed of one of metal and a resin, and a protrusion for promoting rocking of the valve body is provided on a lower surface of the lower layer portion.

According to a tenth aspect of the present invention, there is provided a fuel leakage preventing valve, in which a vertically movable float valve is arranged in a chamber defined inside a housing and in which a valve seat of the housing communicating with the outside is opened and closed by the float valve. In the fuel leakage preventing valve: a protruding step portion is formed upwardly at the center of an upper surface of the float valve; a retainer is fixed to the upper surface side of the float valve, the retainer having a flange portion covering the upper surface of the float valve and a cage portion raised from the flange portion to define an accommodating space in conjunction with the protruding step portion of the float valve; and a valve body for opening and closing the valve seat of the housing is rockably accommodated in the accommodating space defined by the cage portion, wherein a communication path is formed continuously from an inner surface of the cage portion of the retainer to a lower surface of the flange portion, and wherein the accommodating space communicates downwardly with the outside through the communication path.

According to an eleventh aspect of the present invention, in the tenth aspect of the invention, a top portion of the cage portion of the retainer is relatively high in height, and an outer peripheral portion thereof is relatively low in height.

According to a twelfth aspect of the present invention, in the eleventh aspect of the invention, an upper partition wall of the housing is relatively high in height at around the valve seat, and a wall surface continuous therewith is relatively low in height.

According to a thirteenth aspect of the present invention, in the tenth aspect of the invention, an upper inner surface of the cage portion of the retainer is inclined to cross the envelope of the valve body from an outer side toward an inner side.

According to a fourteenth aspect of the present invention, in the tenth aspect of the invention, on an outer peripheral side surface of the float valve, there extrude a plurality of guide ribs beyond the thickness in an outer peripheral portion of the flange portion of the retainer, an annular protruding rim is formed at an outer peripheral edge of the upper surface of the float valve, and the guide ribs are connected by the protruding rim, such that the retainer can be accommodated in a recess defined between the protruding rim at the outer peripheral edge and the protruding step portion at the center.

According to a fifteenth aspect of the present invention, in the tenth aspect of the invention, a recess is formed around the protruding step portion at the center of the upper surface of the float valve, and the flange portion of the retainer is fixed in position within the recess by welding.

According to a sixteenth aspect of the present invention, in the tenth aspect of the invention, the valve body is formed as an integral unit composed of an upper layer portion formed of elastomer and a lower layer portion formed of one of metal and a resin, and a protrusion for promoting rocking of the valve body is provided on a lower surface of the lower layer portion.

Thus, in the first aspect of the present invention, the accommodating space defined by the protruding step portion of the float valve and the cage portion of the retainer communicates downwardly with the upper surface of the flange portion of the retainer through the communication hole, so any fuel tending to gather in the accommodating space is discharged to the outside from the upper surface of the flange portion of the retainer by way of the communication hole. Thus, unlike the prior art, the present invention involves no fear of the float valve itself being subjected to a weight from gathered fuel to cause variations in valve closing characteristics.

In the second aspect of the present invention, the protruding step portion of the float valve is of the same height as or higher than the lower edge of the communication hole provided in the cage portion, and the lower edge of the communication hole of the cage portion is of the same height as or higher than the upper surface of the flange portion of the retainer, so any fuel tending to gather in the accommodating space can be all discharged to the outside.

In the third aspect of the present invention, since the height of the protruding step portion of the float valve is larger than the thickness of the flange portion of the retainer, any fuel tending to gather is drained over a wide range from the accommodating space such that it can be quickly discharged.

In the fourth or eleventh aspect of the present invention, the top portion of the cage portion of the retainer is relatively high in height, and the outer peripheral portion thereof is relatively low in height, so even if the float valve ascends in an inclined state, the cage portion does not interfere with the upper partition wall of the housing, resulting in a reliable valve sealing property.

In the fifth or twelfth aspect of the present invention, the portion of the upper partition wall of the housing is relatively high in height at around the valve seat, and the wall surface continuous therewith is relatively low in height, so it is possible to prevent to the utmost the cage portion of the retainer from interfering with the upper partition wall of the housing when the float valve ascends in an inclined state; and it is also possible to prevent any fuel adhering to the portion around the valve seat from being sucked at the moment the valve is opened, thereby avoiding fuel leakage through the valve seat.

In the sixth or thirteenth aspect of the present invention, the upper inner surface of the cage portion of the retainer is inclined so as to cross the envelope of the valve body from the outer side toward the inner side, so only a small gap is generated for the sidewise movement of the valve body. Thus it is possible to prevent the valve body from rattling, while the valve body is allowed to incline by a relatively large angle, thereby achieving a satisfactory valve sealing property.

In the seventh or fourteenth aspect of the present invention: on the outer peripheral side surface of the float valve, there extend a plurality of guide ribs beyond the thickness in the outer peripheral portion of the flange portion of the retainer; the annular protruding rim is formed at the outer peripheral edge of the upper surface of the float valve; and the guide ribs are connected by the protruding rim, such that the retainer can be accommodated in the recess defined between the protruding rim in the outer periphery and the protruding step portion at the center, so the retainer itself is not brought into contact with the inner surface of the housing, and solely the float valve is brought into contact with the inner surface of the housing through the intermediation of the guide ribs, whereby the vertical movement of the float valve is smoothened. Further, since the guide ribs are firmly connected by the annular protruding rim, they are free from breakage. Further, the retainer is not easily separated from the float valve side.

In the eighth or fifteenth aspect of the present invention, the recess is formed around the protruding step portion at the center of the upper surface of the float valve, and the flange portion of the retainer is fixed in position within the recess by welding. In these aspects, it is possible to define an airtight air chamber between the float valve and the retainer. Further, this air chamber is situated at the uppermost position, so the center of buoyancy is as high as possible, with the center of gravity being low. Thus, when the automobile maintains normal attitude, the float valve is not easily inclined, thereby making it possible to prevent friction with the inner surface of the housing.

In the ninth or sixteenth aspect of the present invention, the valve body is formed as the integral unit composed of the upper layer portion of elastomer and the lower layer portion of metal or resin, with the protrusion for promoting rocking of the valve body being provided on the lower surface of the lower layer portion, so the valve body itself does not easily swell. Further, while there is a fear of the surface of the protruding step portion of the float valve being scraped by the protrusion of the lower layer portion, the scraping does not occur in a uniform fashion, so it is possible to maintain the rocking motion of the valve body for a long period of time.

In the tenth aspect of the present invention, the accommodating space defined by the protruding step portion of the float valve and the cage portion of the retainer communicates downwardly with the outside through the communication path formed continuously from the inner surface of the cage portion of the retainer to the lower surface of the flange portion, so any fuel tending to gather in the accommodating space is discharged to the outside through the communication path. Thus, unlike the prior art, the present invention involves no fear of the float valve itself being subjected to a weight from gathered fuel to cause variations in valve closing characteristics.

DESCRIPTION OF THE PREFERRED EMBODIMENTS

According to the present invention, there is provided a fuel leakage preventing valve in which a float valve is arranged so as to be vertically movable in a chamber defined in a housing and in which a valve seat of the housing communicating with the outside is opened and closed by the float valve: in the valve, a protruding step portion is formed upwardly at the center of the upper surface of the float valve; there is provided a retainer fixed to the upper surface side of the float valve, the retainer having a flange portion covering the upper surface of the float valve and a cage portion raised from the flange portion to define an accommodating space in conjunction with the protruding step portion of the float valve; and a valve body for opening and closing the valve seat of the housing is rockably accommodated in the accommodating space defined by the cage portion, wherein the accommodating space communicates downwardly with the upper surface of the flange portion of the retainer through a communication hole, thereby achieving stabilization in valve closing characteristics.

Further, according to another aspect of the present invention, the accommodating space downwardly communicates with the outside through a communication path formed continuously to extend from the inner surface of the cage portion of the retainer to the lower surface of the flange portion, thereby achieving stabilization in valve closing characteristics.

In the following, preferred embodiments of the present invention will be described in detail with reference to the drawings.

Embodiment 1

Figure 1:
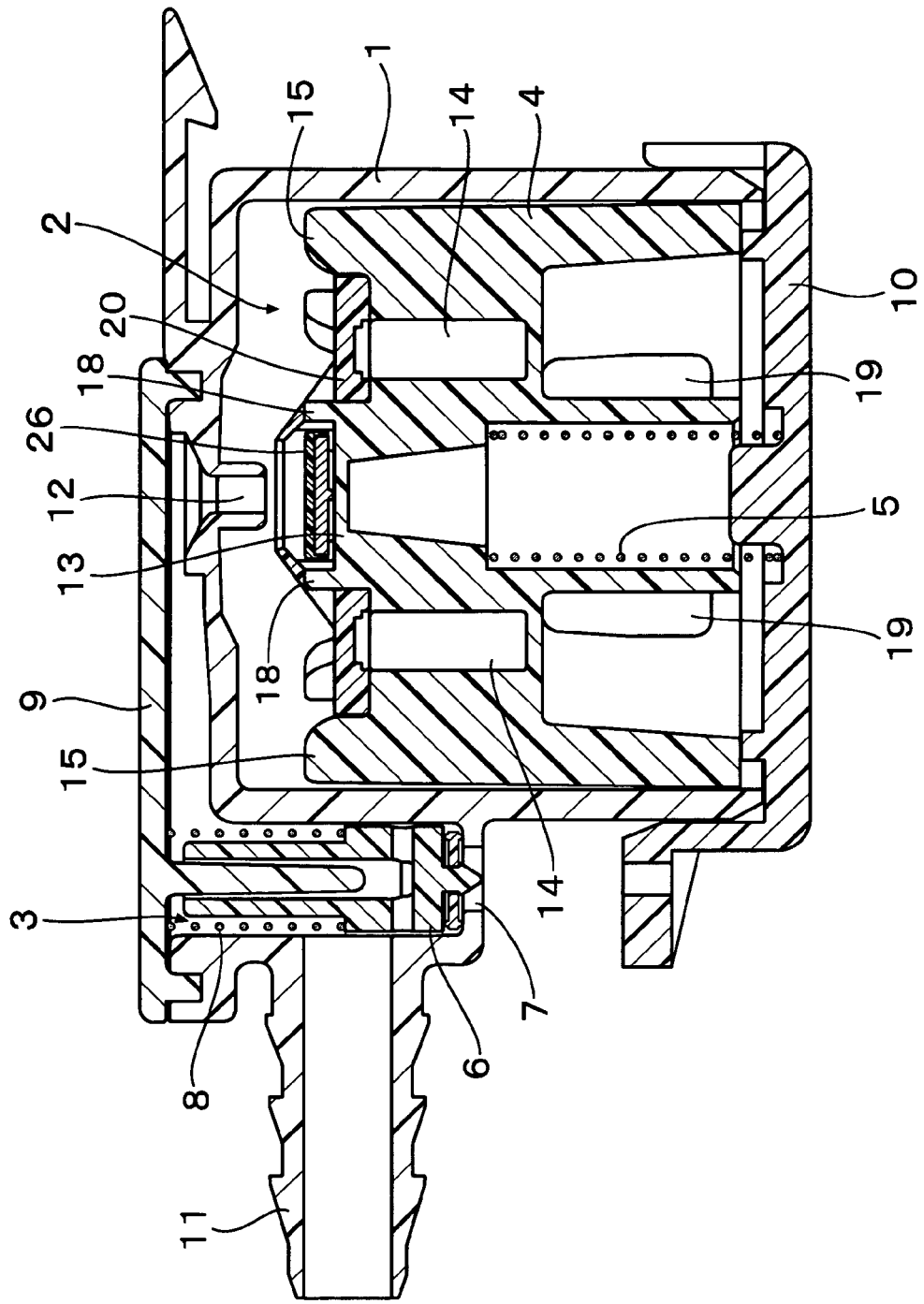
FIG. 1 is a sectional view of a fuel leakage preventing valve according to Embodiment 1 with the valve seat thereof open.
Figure 2:
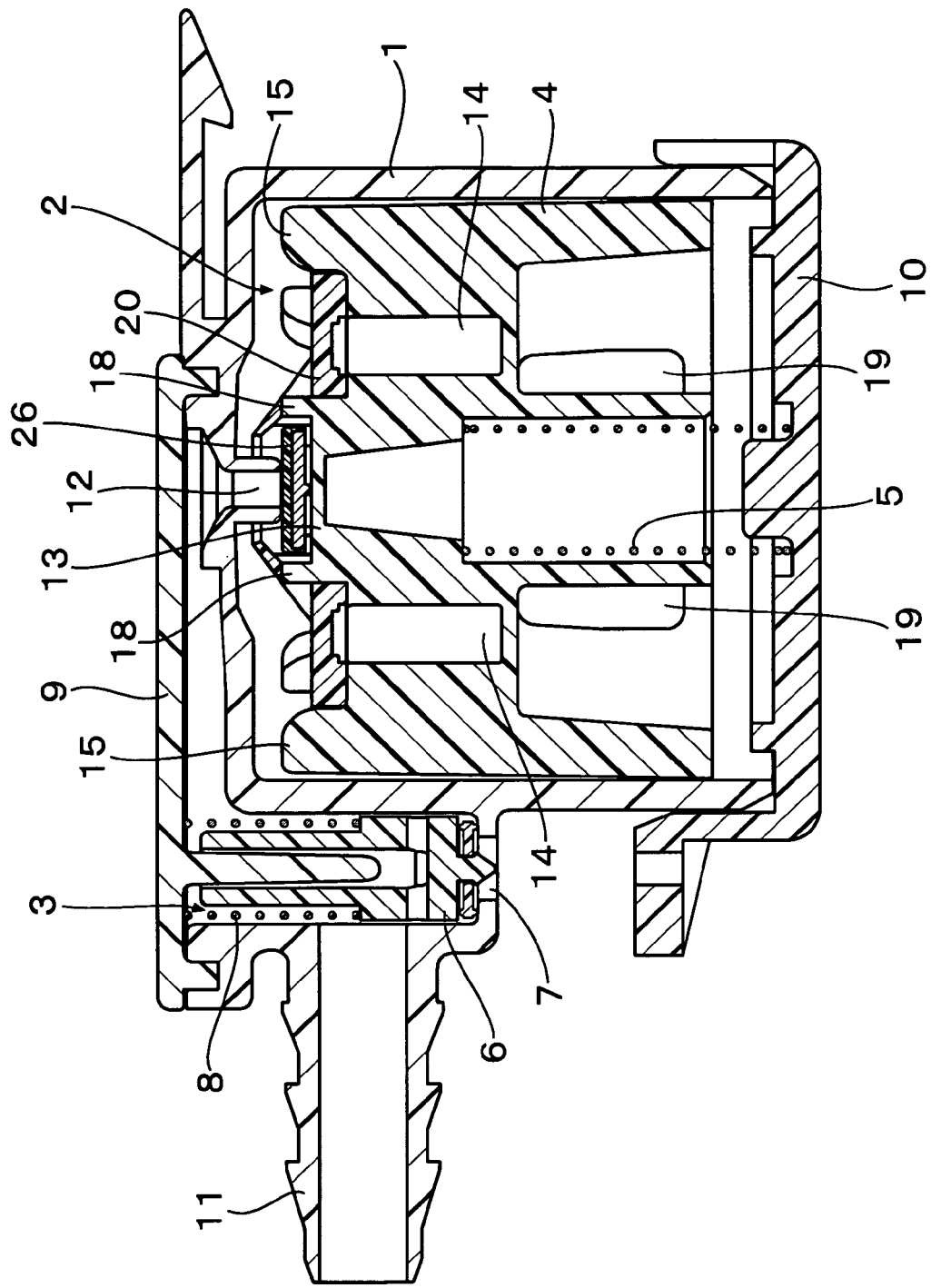
FIG. 2 is a sectional view of the fuel leakage preventing valve with the valve seat thereof closed.

First, as shown in FIGS. 1 and 2, in a fuel leakage preventing valve according to Embodiment 1, within a housing 1 constituting the base body thereof, there are independently defined a float valve chamber 2 and a relief valve chamber 3. In the former, that is, in the float valve chamber 2, a float valve 4 to which a retainer 20 described below is welded is arranged so as to be vertically movable, with the float valve 4 being upwardly urged by the pressure of a spring 5. In the latter, that is, in the relief valve chamber 3, a relief valve 6 is arranged so as to be vertically movable, and an exhaust port 7 is formed in the partition wall of the relief valve chamber 3 so as to communicate with a fuel tank, with the exhaust port 7 being normally closed with the pressure of a spring 8. Numeral 9 indicates an upper cap attached to the upper side of the housing 1, and numeral 10 indicates a lower cap attached to the lower side of the housing 1.

Figure 3:
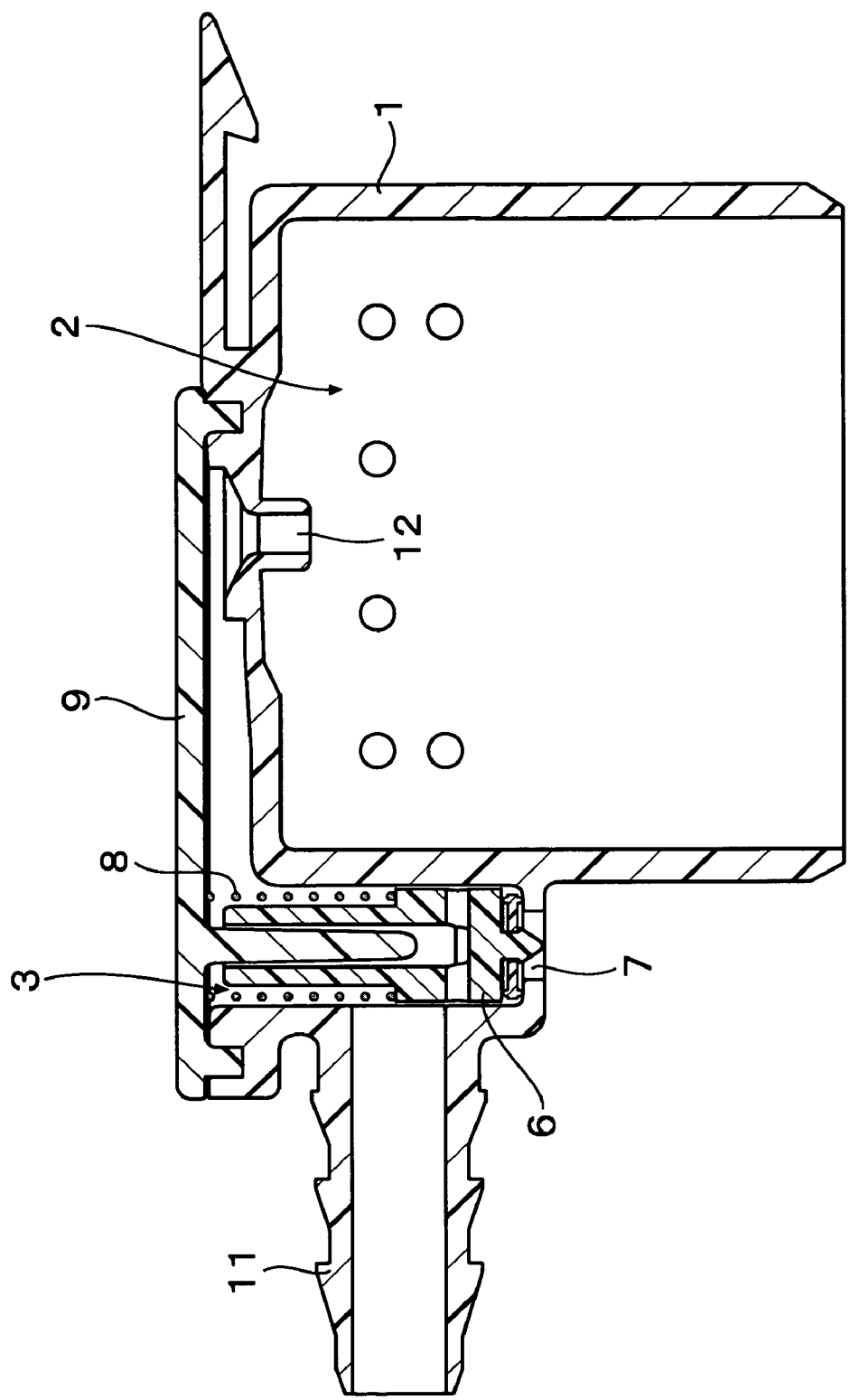
FIG. 3 is a sectional view of a housing with an upper cap and a relief valve attached thereto.

As shown also in FIG. 3, in the housing 1, there is formed in the upper partition wall of the float valve chamber 2 a valve seat 12 communicating with the outside through a connection pipe 11. The portion of the upper partition wall around the valve seat 12 is relatively high in height, and the wall surface continuous therewith is made gradually lower in height. Thus, when the float valve 4 ascends in an inclined state, it is possible to prevent to the utmost a cage portion 22 of the retainer 20 described below from interfering with the upper partition wall of the housing 1. Thus, the valve seat 12 itself protrudes downwardly from the upper partition wall.

Figure 4A:
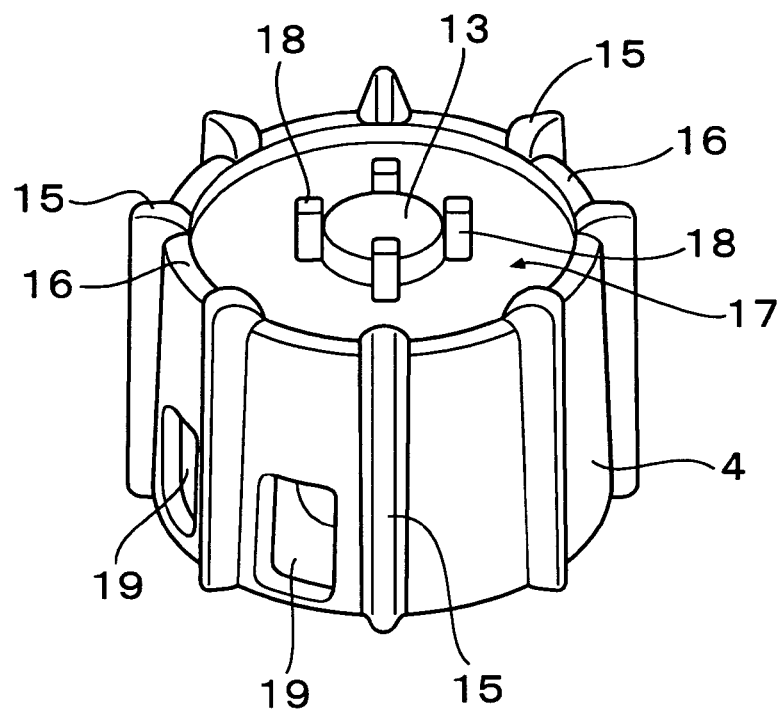
FIG. 4A is a perspective view of a float valve.
Figure 4B:
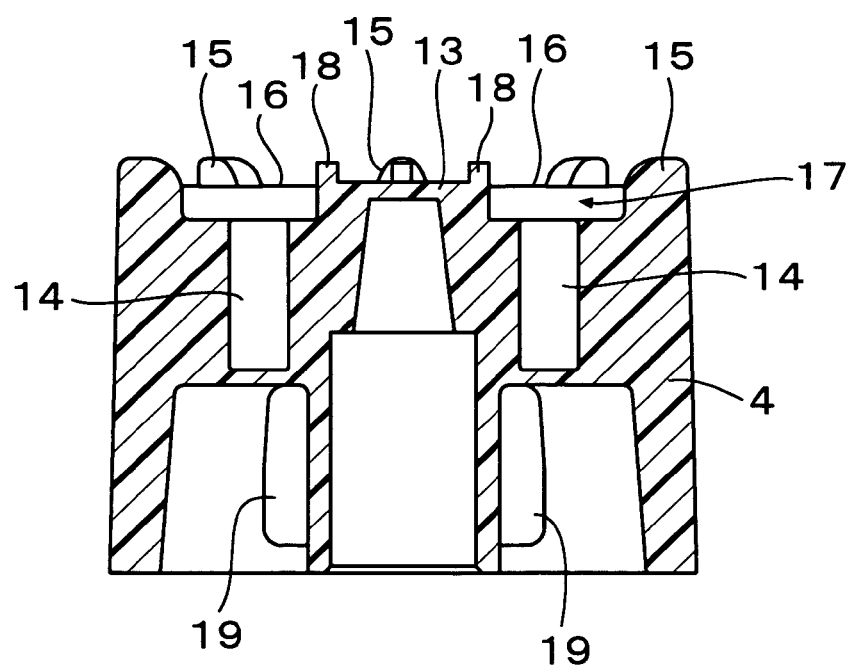
FIG. 4B is a sectional view of the float valve.

As shown also in FIG. 4, an upwardly protruding columnar protruding step portion 13 is formed at the center of the upper surface of the float valve 4. Around the protruding step portion 13, there are formed, at predetermined intervals, annular recesses of a predetermined depth constituting air chambers 14. On the outer peripheral side surface of the float valve 4, there are formed, at equal intervals, a plurality of guide ribs 15 extending upwardly beyond the thickness of the outer peripheral portion of a flange portion 21 of the retainer 20 described below. At the outer peripheral edge of the upper surface of the float valve 4, there is continuously formed an annular protruding rim 16, by means of which the guide ribs 15 are connected to each other. The flange portion 21 of the retainer 20 described below is put in a recess 17 defined between the protruding rim 16 in the outer periphery and the protruding step portion 13 at the center. The flange portion 21 is fixed in position within the recess 17 by welding so as to close the upper openings of the recesses that constitute the air chambers 14, whereby the air chambers 14 are made airtight.

Thus, the airtight air chambers 14 are situated at the uppermost position in the float valve 4. As a result, the center of buoyancy of the float valve 4 is as high as possible, and the center of gravity thereof is low, so when the automobile maintains the normal attitude, the float valve 4 is not easily inclined, thus making it possible to prevent friction with the inner surface of the housing 1. At the root of the protruding step portion 13 of the float valve 4, there are provided positioning pins 18 to be fit-engaged with mounting holes 24 provided in the flange portion 21 of the retainer 20 described below. Further, in the lower portion of the float valve 4, there are provided a plurality of cutout windows 19 for achieving a reduction in weight.

Figure 5A:
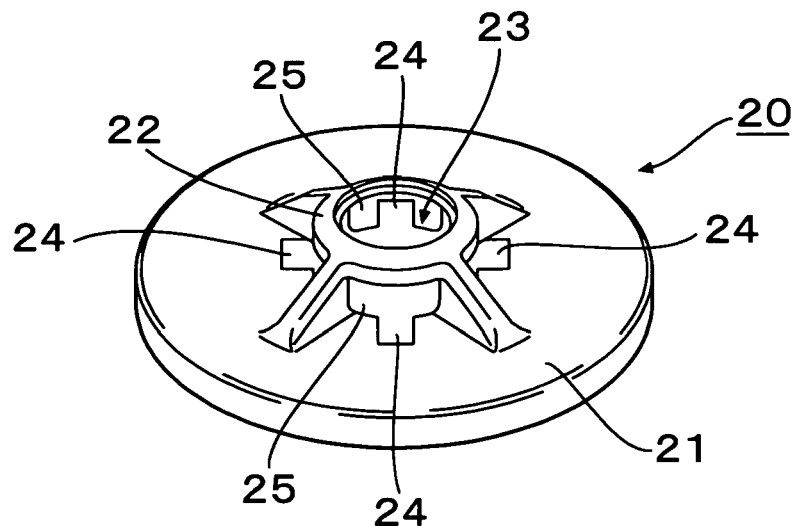
FIG. 5A is a perspective view of a retainer.
Figure 5B:
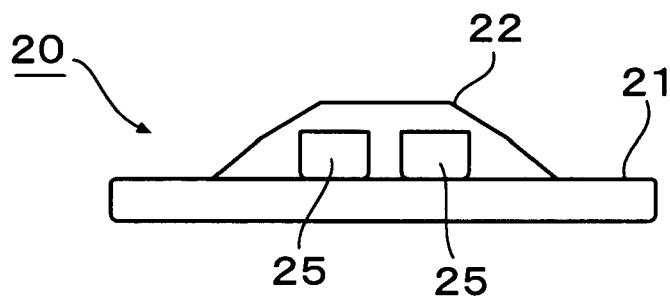
FIG. 5B is a front view of the retainer.
Figure 5C:
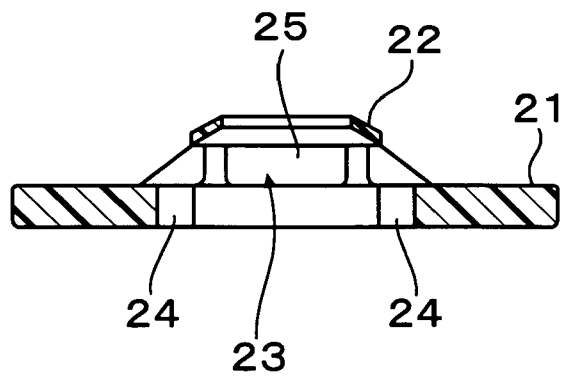
FIG. 5C is a sectional view of the retainer.

As shown also in FIG. 5, the retainer 20 is equipped with: the flange portion 21 in the form of a disc which covers the upper surface of the float valve 4; and the cage portion 22 which is raised from the center of the flange portion 21 and defines, in conjunction with the protruding step portion 13 of the float valve 4, an accommodating space 23 rockably accommodating a valve body 26 described below. The flange portion 21 is provided with a plurality of mounting holes 24 to be fit-engaged with the positioning pins 18. The cage portion 22 is positively configured such that its top portion is relatively high in height and that the outer peripheral portion thereof is relatively low in height. In the above-mentioned outer peripheral portion, there are provided a plurality of communication holes 25 establishing communication between the accommodating space 23 and the outside. Further, the upper inner surface of the cage portion 22 is inclined so as to cross the envelope of the valve body 26 from the outer side toward the inner side (see FIG. 9).

Figure 9:
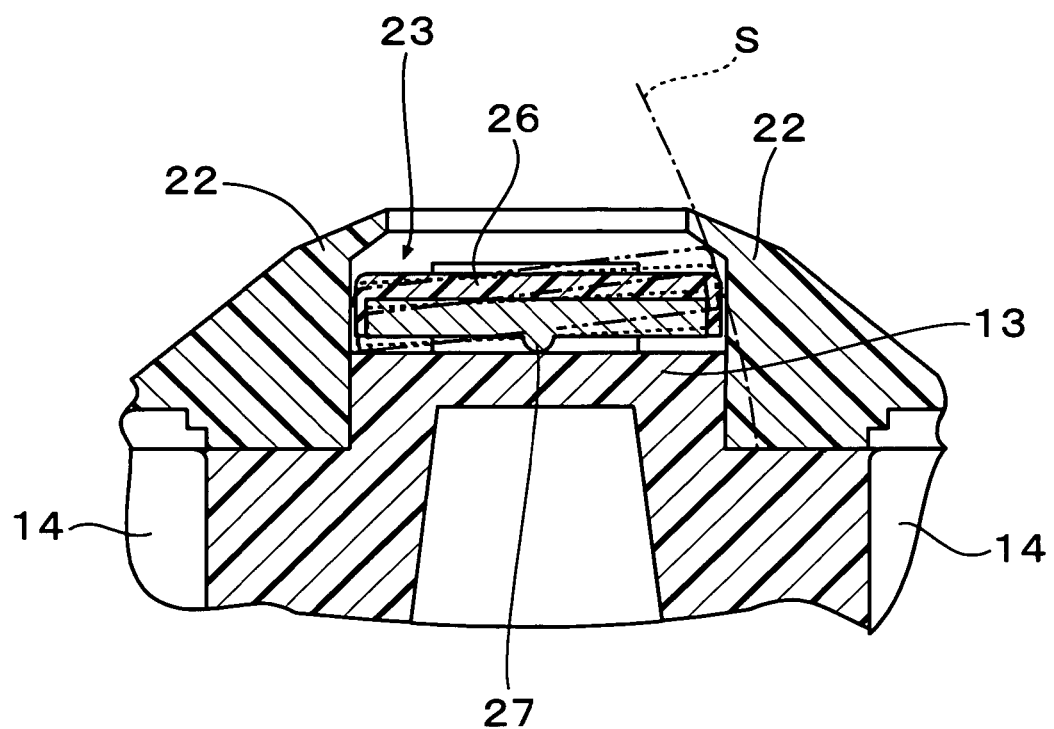
FIG. 9 is a main portion explanatory view showing how the valve body is inclined along the envelope thereof.

As shown in FIG. 9, the valve body 26 may tend to rotate around one end thereof within the cage portion 22. The envelope S of the valve body 26 means the locus of the other end of the valve body 26 in this rotation. The upper peripheral wall of the cage portion 22 extends obliquely inwards so that the upper inner surface of the cage portion 22 crosses the envelope S.

Figure 6:
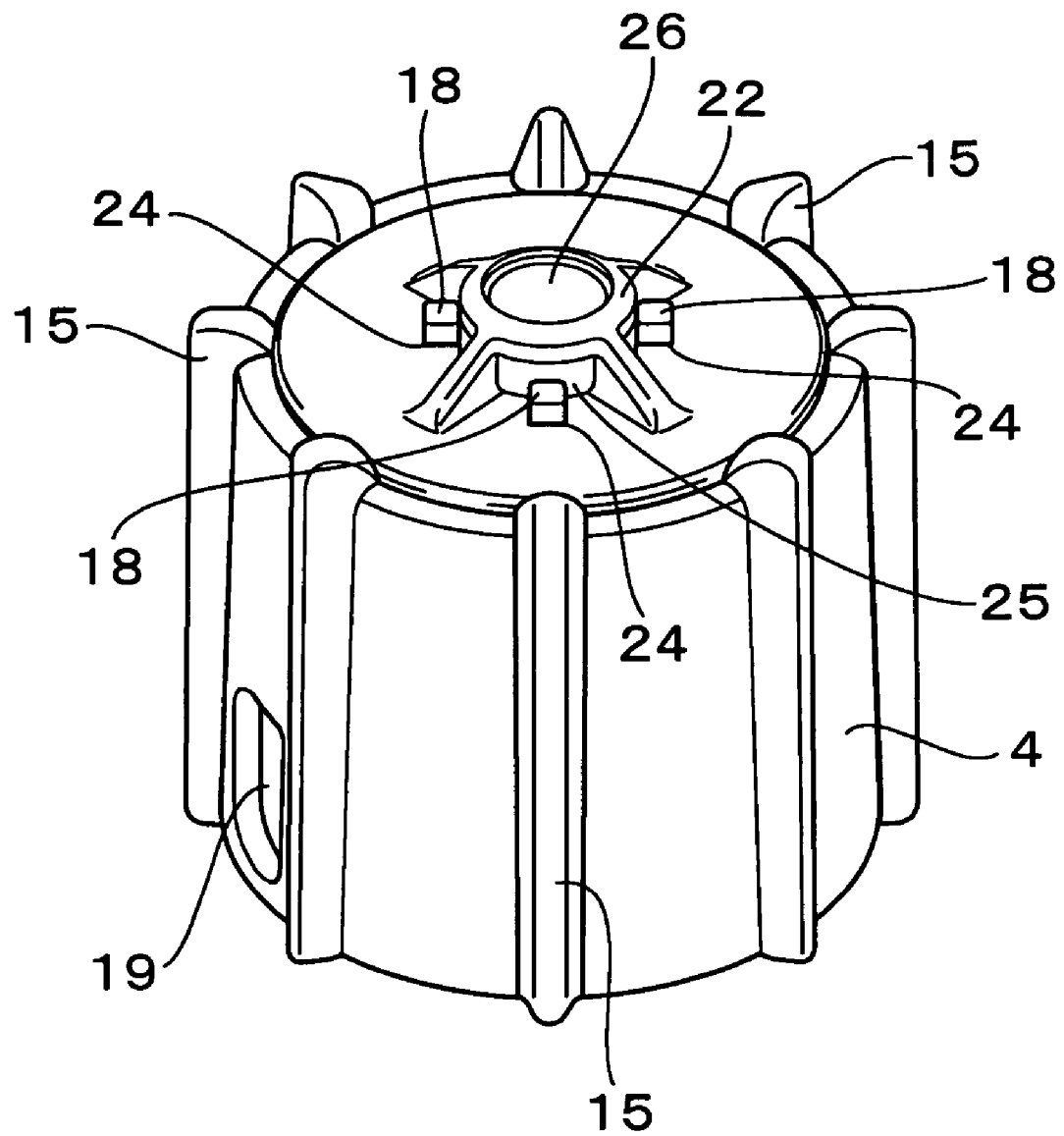
FIG. 6 is a perspective view of the float valve and the retainer as integrated with each other.
Figure 7:
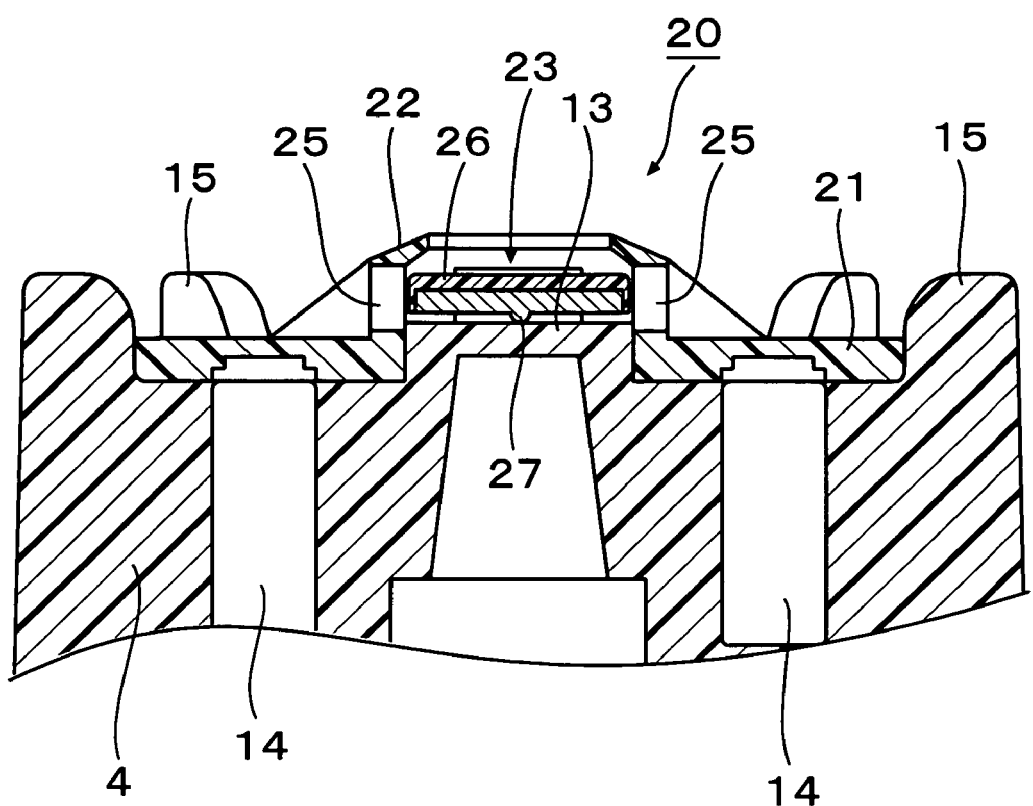
FIG. 7 is a main portion perspective view of the float valve and the retainer as integrated with each other.

As stated above, the flange portion 21 of the retainer 20 is fixed in position within the recess 17 of the float valve 4 by welding, whereby the retainer 20 and the float valve 4 are integrated with each other as shown in FIG. 6. As shown in FIG. 7, in this state, the protruding step portion 13 of the float valve 4 is set to be of the same height as or higher than the lower edges of the communication holes 25 provided in the cage portion 22, and the lower edges of the communication holes 25 of the cage portion 22 are set to be of the same height as or higher than the upper surface of the flange portion 21. Further, the height of the protruding step portion 13 of the float valve 4 is set to be larger than the thickness of the flange portion 21 of the retainer 20.

Thus, in Embodiment 1, due to the effect of the communication holes 25 with a difference in height as described above, any fuel tending to gather in the accommodating space 23 is discharged to the outside from the upper surface of the flange portion 21 of the retainer by way of the communication holes 25, so, unlike the prior art, this embodiment involves no fear of the float valve 4 itself being subjected to a weight from gathered fuel to cause variations in valve closing characteristics. Further, in this case, any fuel tending to gather in the accommodating space 23 can be all discharged, and is drained over a wide range from the accommodating space 23, so it is advantageously possible to discharge the fuel quickly.

Figure 8:
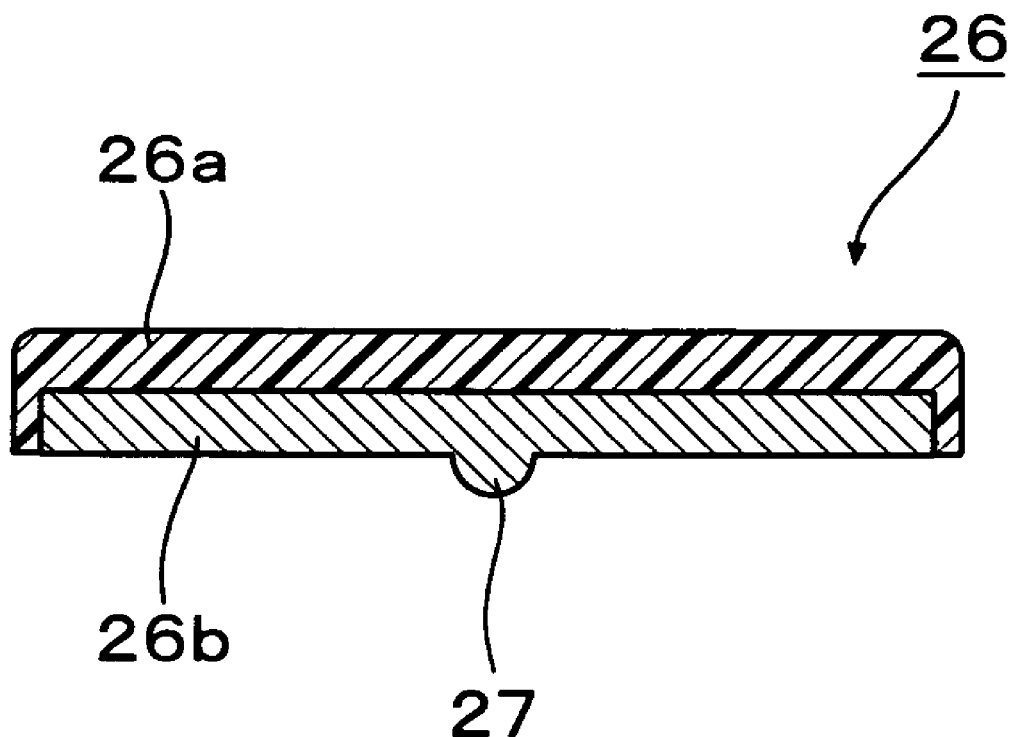
FIG. 8 is a sectional view of a valve body.

As shown also in FIG. 8, the valve body 26 is formed as an integral unit composed of an upper layer portion 26a of elastomer and a lower layer portion 26b of metal or hard resin. Thus, the valve body 26 does not easily swell. On the lower surface of the hard lower layer portion 26b, there is integrally provided a protrusion 27 adapted to come into contact with the surface of the protruding step portion 13 of the float valve 4 to thereby promote rocking of the valve body 26.

When the protrusion 27 of the valve body 26 is formed of a material harder than the protruding step portion 13, it is assumed that the protruding step portion 13 is more subject to wear than the protrusion 27. However, there is generated some clearance between the outer periphery of the valve body 26 rockably accommodated in the cage portion 22 and the inner periphery of the cage portion 22, so this clearance allows rocking of the valve body 26. Thus, the hard protrusion 27 slides on the soft protruding step portion 13 within the area of a circle having a diameter corresponding to the clearance, while the sliding amount per unit length of the protruding step portion 13 is small, so it is possible to minimize the worn-out amount of the protruding step portion 13.

The protrusion 27, on the other hand, is held in contact with the protruding step portion 13 mainly with the pointed distal end thereof, so the sliding amount per unit length of the protrusion 27 is large. However, since the protrusion 27 is formed of a material harder than the protruding step portion 13, it is possible to minimize the worn-out amount of the protrusion 27.

As described above, the protrusion 27 of the valve body 26, because it is formed of hard material, involves a relatively small worn-out amount even if it is held in contact with the protruding step portion 13 with small contact area. On the other hand, the protruding step portion 13, which is formed of soft material, involves a relatively small worn-out amount since it can be held in contact with the protrusion 27 with large contact area. Thus, when combined with each other, the protrusion 27 and the protruding step portion 13 help to achieve a reduction in worn-out amount, thereby making it possible to maintain the rocking motion of the valve body 26 for a long period of time.

When in use, this fuel leakage preventing valve, constructed as described above, is installed on the upper side of a fuel tank (not shown). As shown in FIG. 1, in this state, the float valve 4 is normally at the lowered position within the float valve chamber 2 of the housing 1, so the valve seat 12 formed in the upper partition wall of the float valve chamber 2 is open, and fuel vapor inside the fuel tank is given off to the outside by way of a canister through the connection pipe 11 provided in the housing 1, whereby it is possible to effectively prevent an abnormal increase in the inner pressure of the fuel tank.

If the automobile makes cornering or the like and some of the fuel in the fuel tank reaches the interior of the float valve chamber 2 by way of through-holes provided in the housing 1 and the lower cap, as shown in FIG. 2, the float valve 4 automatically ascends due to its buoyancy and the urging pressure of the spring 5, thereby causing the valve seat 12 provided in the upper partition wall of the housing 1 to enter the cage portion 22 of the retainer 20. Then, the valve seat 12 is closed by the valve body 26 rockably provided in the accommodating space 23 defined by the cage portion 22, thereby reliably preventing fuel leakage.

When the fuel flows out of the float valve chamber 2, the float valve 4 loses its buoyancy, and descends within the float valve chamber 2 together with the retainer 20. Here, it should be noted, in particular, that any fuel tending to gather in the accommodating space 23 is discharged to the outside by way of the communication holes 25 and from the upper surface of the flange portion 21 of the retainer 20, so, unlike the prior art, this embodiment involves no fear of the float valve 4 itself being subjected to a weight from gathered fuel to cause variations in valve closing characteristics. Further, not only is it possible to discharge all the fuel tending to gather in the accommodating space 23, but the fuel is drained from the accommodating space 23 over a wide range, so quick discharge of fuel is to be expected.

When the inner pressure of the fuel tank increases, with the valve seat 12 closed by the float valve 4 by virtue of its buoyancy, the relief valve 6 in the relief valve chamber 3 ascends against the pressure of the spring 8 to open the exhaust port 7 to thereby give off fuel vapor to the outside, whereby it is also possible to prevent breakage of the fuel tank attributable to the inner pressure.

Further, in Embodiment 1, the top portion of the cage portion 22 of the retainer 20 is relatively high in height, and the outer peripheral portion thereof is relatively low in height. Further, the upper partition wall of the housing 1 corresponding thereto is relatively high in height at around the valve seat 12, and the wall surface continuous therewith is relatively low in height. Thus, even if the float valve 4 ascends in an inclined state, there is no fear of the cage portion 22 interfering with the upper partition wall of the housing 1, thus providing a reliable valve sealing property. Further, if the float valve 4 ascends in an inclined state, it is possible to prevent to the utmost the cage portion 22 of the retainer 20 from interfering with the upper partition wall of the housing 1, and at the same time, it is possible to prevent any fuel adhering to the portion around the valve seat 12 from being sucked at the moment the valve is opened, thus avoiding fuel leakage through the valve seat 12.

Further, in Embodiment 1, the upper inner surface of the cage portion 22 of the retainer 20 is inclined so as to cross the envelope of the valve body 26 from the outer side toward the inner side, so there is generated only a small gap for the sidewise movement of the valve body 26, whereby rattling of the valve body 26 is prevented. In addition, as shown in FIG. 9, the inclination of the valve body 26 is permissible up to a large angle, so the valve body 26 rocks positively, thereby providing a satisfactory valve sealing property.

Embodiment 2

Figure 10:
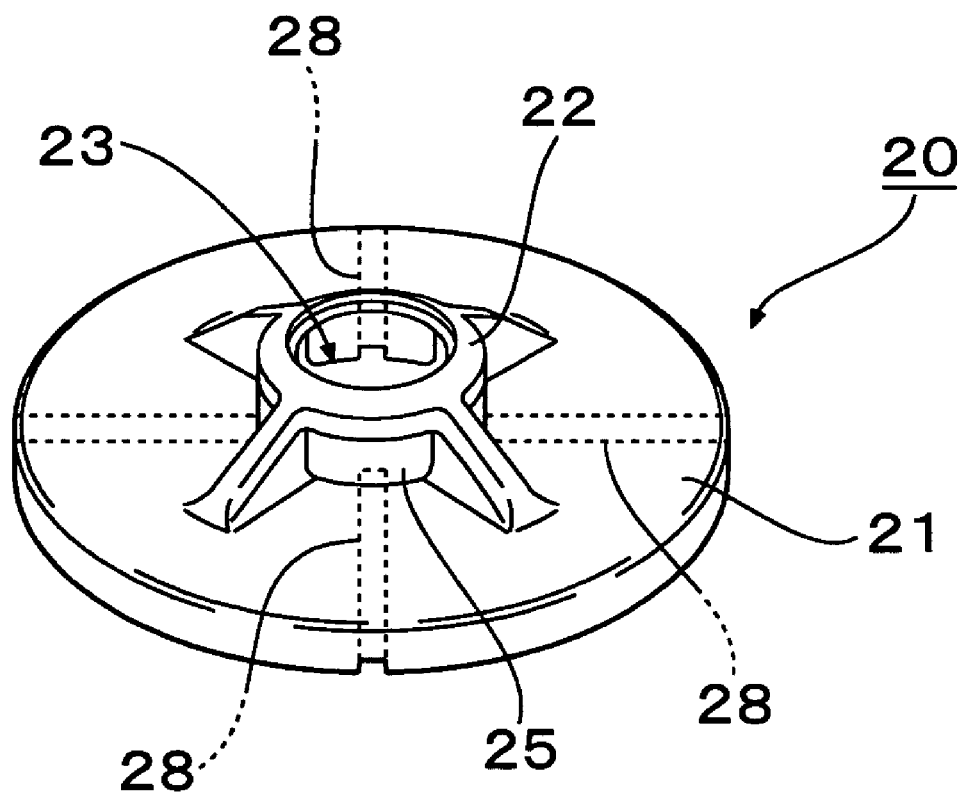
FIG. 10 is a perspective view of a retainer in Embodiment 2 of the present invention.
Figure 11:
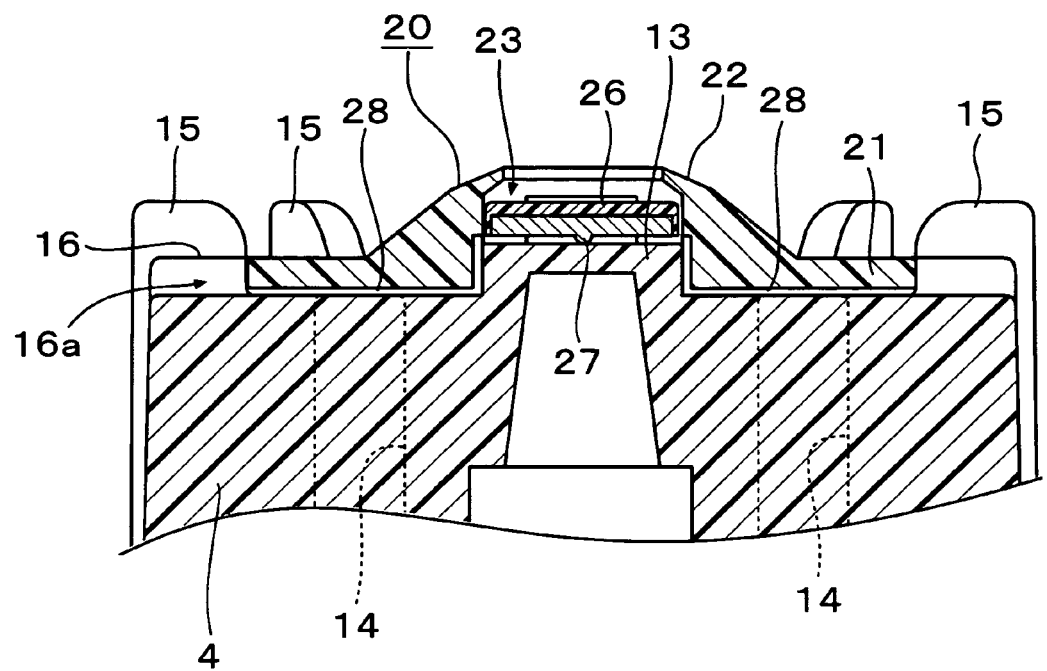
FIG. 11 is a main portion sectional view of the retainer as fixed to a float valve.

Next, a fuel leakage preventing valve according to Embodiment 2 will be described. While in Embodiment 1 fuel is passed through the communication holes 25 and discharged to the outside from the upper surface of the flange portion 21 of the retainer 20, Embodiment 2 adopts a construction in which, as shown in FIGS. 10 and 11, four communication paths 28 are radially formed to extend from the inner surface of the cage portion 22 of the retainer 20 along the lower surface of the flange portion 21, thus establishing communication between the accommodating space 23 and the outside through the communication paths 28.

Figure 12:
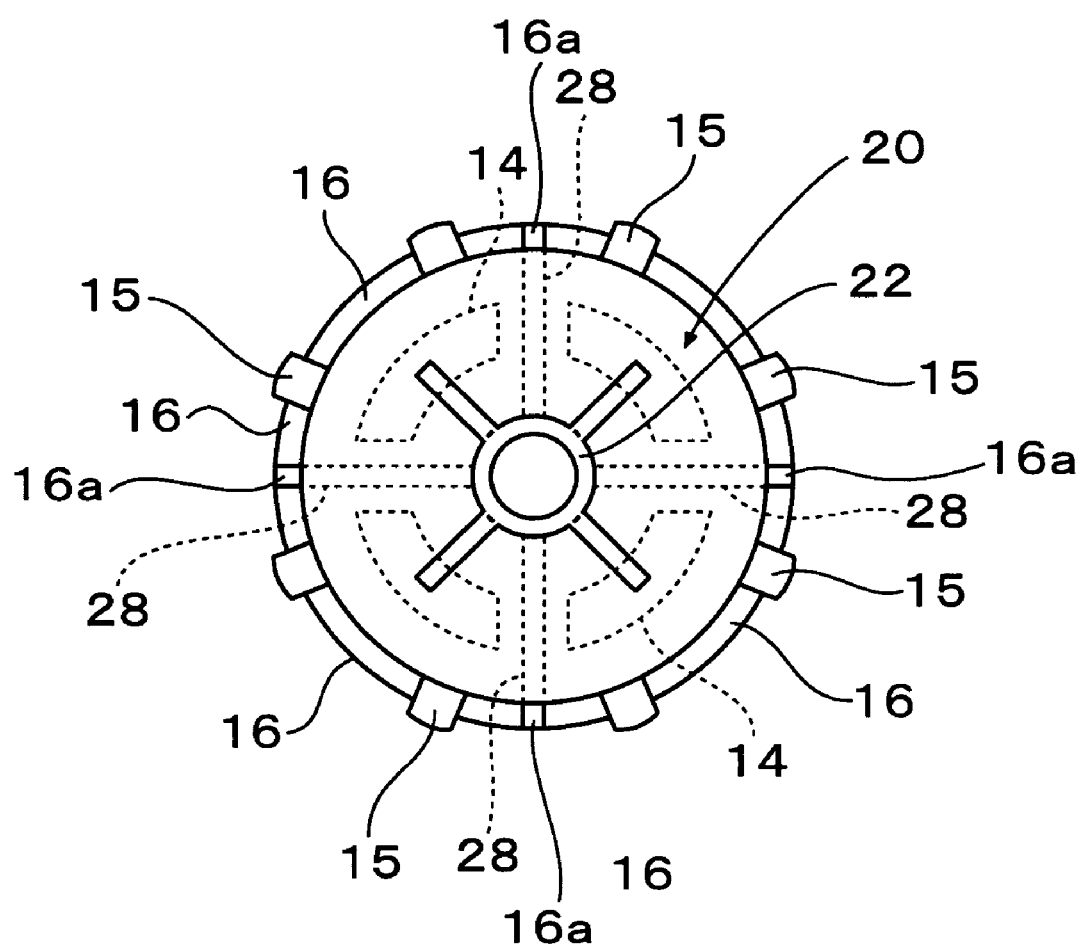
FIG. 12 is a plan view of the retainer as fixed to the float valve.

As shown in FIG. 12, the retainer 20 is assembled to the float valve 4 such that the four radial communication paths 28 are arranged between the plurality of guide ribs 15 formed at equal intervals in the outer periphery of the float valve 4. Further, as shown in FIG. 12, in the upper end portions of the protruding rim 16, cut-out portions 16a situated at the forward ends of the communication paths 28 of the retainer 20 are formed, thereby allowing the communication paths 28 to communicate with the outside through the cut-out portion 16a. The air chambers 14 are formed at positions where they do not overlap the plurality of communication paths 28 when the retainer 20 is assembled to the float valve 4.

Thus, in Embodiment 2 also, any fuel tending to gather in the accommodating chamber 23 is all discharged to the outside through the communication paths 28, so, unlike the prior art, this embodiment involves no fear of the float valve 4 itself being subjected to a weight from gathered fuel to cause variations in valve closing characteristics. Otherwise, the effects and operation of this embodiment is the same as those of Embodiment 1, so a redundant description thereof will be omitted.

In the fuel leakage preventing valve of the present invention, any fuel tending to gather in the accommodating space defined by the protruding step portion of the float valve and the cage portion of the retainer is all discharged to the outside by way of the communication holes or the communication paths, and there is no fear of variations in valve closing characteristics being generated. Thus, if applied to the fuel tank of an automobile, this fuel leakage preventing valve proves very convenient.

What is claimed is:

1. A fuel leakage preventing valve, in which a vertically movable float valve is arranged in a chamber defined inside a housing and in which a valve seat of the housing communicating with an outside is opened and closed by the float valve, which comprises:

a protruding step portion which is formed upwardly a center of an upper surface of the float valve;

a retainer fixed to the upper surface side of the float valve, the retainer including: a flange portion covering the upper surface of the float valve; and a cage portion raised from the flange portion to define an accommodating space in conjunction with the protruding step portion of the float valve, the cage portion having a top portion and a peripheral portion continuous with the top portion, the top portion being relatively higher in height at a center of the cage portion compared to the peripheral portion; and a valve body for opening and closing the valve seat of the housing, the valve body being rockably accommodated in the accommodating space defined by the cage portion, wherein the accommodating space communicates downwardly with an upper surface of the flange portion of the retainer through a communication hole, and wherein the cage portion has an inner peripheral wall that extends obliquely inwards so as to cross a locus of rotational movement about an end of the valve body.

2. A fuel leakage preventing valve according to claim 1, wherein:

the protruding step portion of the float valve is at least of the same height as a lower edge of the communication hole provided in the cage portion; and the lower edge of the communication hole of the cage portion is at least of the same height as the upper surface of the flange portion of the retainer.

3. A fuel leakage preventing valve according to claim 2, wherein the height of the protruding step portion of the float valve is larger than the thickness of the flange portion of the retainer.

4. A fuel leakage preventing valve according to claim 1, wherein:

an upper partition wall of the housing is arranged to have the valve seat protruding downwardly from an underside surface of the upper partition wall at the center thereof and to set the level in height of the underside surface of the upper partition wall in a region around the valve seat to be relatively high compared with the level in height of the underside surface in a peripheral region continuous with the region around the valve seat.

5. A fuel leakage preventing valve according to claim 1, wherein:

on an outer peripheral side surface of the float valve, there extends a plurality of guide ribs beyond a thickness in an outer peripheral portion of the flange portion of the retainer;

an annular protruding rim is formed at an outer peripheral edge of the upper surface of the float valve; and the guide ribs are connected by a protruding rim, such that the retainer can be accommodated in a recess defined between the protruding rim at an outer peripheral edge and the protruding step portion at the center.

6. A fuel leakage preventing valve according to claim 1, wherein:

a recess is formed around the protruding step portion at the center of the upper surface of the float valve; and the flange portion of the retainer is fixed in position within the recess by welding.

7. A fuel leakage preventing valve according to claim 1, wherein:

the valve body is formed as an integral unit composed of an upper layer portion formed of elastomer and a lower layer portion formed of one of metal and a resin; and a protrusion for promoting rocking of the valve body is provided on a lower surface of the lower layer portion.

8. A fuel leakage preventing valve, in which a vertically movable float valve is arranged in a chamber defined inside a housing and in which a valve seat of the housing communicating with an outside is opened and closed by the float valve, which comprises:

a protruding step portion which is formed upwardly at the center of an upper surface of the float valve;

a retainer fixed to the upper surface side of the float valve, the retainer including: a flange portion covering the upper surface of the float valve; and a cage portion raised from the flange portion to define an accommodating space in conjunction with the protruding step portion of the float valve, the cage portion having a top portion and a peripheral portion continuous with the top portion, the top portion being relatively higher in height at a center of the cage portion compared to the peripheral portion; and a valve body for opening and closing the valve seat of the housing, the valve body being rockably accommodated in the accommodating space defined by the cage portion, wherein a communication path is formed continuously from an inner surface of the cage portion of the retainer to a lower surface of the flange portion, wherein the accommodating space communicates downwardly with the outside through the communication path, and wherein the cage portion has an inner peripheral wall with an upper surface that extends obliquely inwards so as to cross a locus of rotational movement about an end of the valve body.

9. A fuel leakage preventing valve according to claim 8, wherein:

an upper partition wall of the housing is arranged to have the valve seat protruding downwardly from an underside surface of the upper partition wall at the center thereof and to set the level in height of the underside surface of the upper partition wall in a region around the valve seat to be relatively high compared with the level in height of the underside surface in a peripheral region continuous with the region around the valve seat.

10. A fuel leakage preventing valve according to claim 8, wherein:

on an outer peripheral side surface of the float valve, there extends a plurality of guide ribs beyond a thickness in an outer peripheral portion of the flange portion of the retainer;

an annular protruding rim is formed at an outer peripheral edge of the upper surface of the float valve; and guide ribs are connected by the protruding rim, such that the retainer can be accommodated in a recess defined between the protruding rim at the outer peripheral edge and the protruding step portion at the center.

11. A fuel leakage preventing valve according to claim 8, wherein:

a recess is formed around the protruding step portion at the center of the upper surface of the float valve; and the flange portion of the retainer is fixed in position within the recess by welding.

12. A fuel leakage preventing valve according to claim 8, wherein:

the valve body is formed as an integral unit composed of an upper layer portion formed of elastomer and a lower layer portion formed of one of metal and a resin; and a protrusion for promoting rocking of the valve body is provided on a lower surface of the lower layer portion.

* * * * *